United States Patent
Völker et al.

(10) Patent No.: US 10,330,108 B2
(45) Date of Patent: Jun. 25, 2019

(54) FUEL PUMP HAVING ELECTRICALLY INSULATED BEARINGS

(71) Applicant: CONTINENTAL AUTOMOTIVE GMBH, Hannover (DE)

(72) Inventors: Marc Völker, Magdeburg (DE); Gabriel Simara Lima, Hofheim am Taunus (DE); Ralf Muehlhausen, Rotenburg (DE)

(73) Assignee: Continental Automotive GmbH, Hannover (DE)

( * ) Notice: Subject to any disclaimer, the term of this patent is extended or adjusted under 35 U.S.C. 154(b) by 14 days.

(21) Appl. No.: 15/872,502

(22) Filed: Jan. 16, 2018

(65) Prior Publication Data
US 2018/0138775 A1 May 17, 2018

Related U.S. Application Data

(63) Continuation of application No. PCT/EP2016/065687, filed on Jul. 4, 2016.

(30) Foreign Application Priority Data

Jul. 16, 2015 (DE) .................. 10 2015 213 420

(51) Int. Cl.
*H02K 5/16* (2006.01)
*F04D 13/06* (2006.01)
(Continued)

(52) U.S. Cl.
CPC ..... *F04D 29/0467* (2013.01); *F04D 13/0633* (2013.01); *F04D 13/086* (2013.01);
(Continued)

(58) Field of Classification Search
CPC ........ F04D 13/06; F04D 29/04; F04D 29/041; F04D 29/0467; F04D 29/0465;
(Continued)

(56) References Cited

U.S. PATENT DOCUMENTS 3,658,444 A 4/1972 Rhodes et al.
3,666,381 A 5/1972 Parrent et al.
(Continued)

FOREIGN PATENT DOCUMENTS

CN 201202729 3/2009
CN 103089829 A 5/2013
(Continued)

OTHER PUBLICATIONS

International Search Report and Written Opinion dated Sep. 26, 2016 from corresponding International Patent Application No. PCT/EP2016/065687.
(Continued)

*Primary Examiner* — Bryan M Lettman
*Assistant Examiner* — Timothy P Solak

(57) ABSTRACT

A fuel delivery pump for delivering fuel, having an electric motor and having a pump impeller that is driven by means of the electric motor, wherein the pump impeller is connected by means of a shaft to a rotor of the electric motor such that a rotational movement of the rotor is transmitted via the shaft to the pump impeller, wherein the shaft is mounted by means of an axial bearing in an axial direction and/or by means of a radial bearing in a radial direction relative to a pump stage in which the pump impeller is arranged, wherein an electrical insulation element is arranged between the axial bearing and the pump stage, and/or an electrical insulation element is arranged between the radial bearing and the pump stage.

11 Claims, 2 Drawing Sheets

(51) Int. Cl.
  *F04D 13/08* (2006.01)
  *F04D 29/02* (2006.01)
  *F04D 29/40* (2006.01)
  *F04D 29/041* (2006.01)
  *F04D 29/043* (2006.01)
  *F04D 29/046* (2006.01)
  *F02M 37/04* (2006.01)

(52) U.S. Cl.
  CPC .......... *F04D 29/026* (2013.01); *F04D 29/041* (2013.01); *F04D 29/0465* (2013.01); *F04D 29/406* (2013.01); *H02K 5/16* (2013.01); *F02M 37/048* (2013.01); *F04D 13/0653* (2013.01); *F04D 29/043* (2013.01); *F04D 29/046* (2013.01)

(58) Field of Classification Search
  CPC .......... H02K 5/167; H02K 5/16; H02K 5/173; F16C 19/12; F16C 19/14; F16C 19/34; F16C 19/188; F16C 2202/32; F16C 2202/24; F16C 2223/30; F16C 2223/70; F16C 2300/34; F02M 37/048
  See application file for complete search history.

(56) References Cited

U.S. PATENT DOCUMENTS

| | | | |
|---|---|---|---|
| 4,619,588 A | 10/1986 | Moore et al. | |
| 4,699,573 A * | 10/1987 | Petrie | F04D 29/026 384/905 |
| 7,265,466 B2 | 9/2007 | Yamashita et al. | |
| 2003/0215343 A1 * | 11/2003 | Laing | F04D 29/0467 417/423.7 |
| 2005/0151440 A1 | 7/2005 | Yamashita et al. | |
| 2006/0008344 A1 * | 1/2006 | Ando | F02M 37/048 415/55.1 |
| 2008/0036321 A1 * | 2/2008 | Yu | F04D 29/0467 310/90.5 |
| 2008/0216904 A1 * | 9/2008 | Kanamaru | B01D 29/56 137/565.01 |
| 2010/0172776 A1 * | 7/2010 | Fischer | F02M 37/048 417/423.12 |
| 2011/0070099 A1 * | 3/2011 | Schlenhoff | F04D 29/047 417/53 |
| 2011/0129176 A1 * | 6/2011 | Koma | B60B 27/001 384/484 |
| 2013/0125538 A1 | 5/2013 | Frey et al. | |

FOREIGN PATENT DOCUMENTS

| | | |
|---|---|---|
| DE | 2245009 | 4/1974 |
| DE | 4013032 | 10/1991 |
| DE | 102005001697 A1 | 11/2005 |
| EP | 05499008 | 6/1996 |
| EP | 0812393 | 12/1997 |
| EP | 1584812 | 1/2004 |
| JP | H04 203287 | 7/1992 |
| JP | H04203288 | 7/1992 |
| JP | 2004092484 | 3/2004 |
| JP | 2005204386 A | 7/2005 |
| JP | 2010528218 A | 8/2010 |

OTHER PUBLICATIONS

German Office Action dated Mar. 23, 2017 for corresponding German Patent Application No. 10 2015 213 420.2.

* cited by examiner

FUEL PUMP HAVING ELECTRICALLY INSULATED BEARINGS

CROSS-REFERENCE TO RELATED APPLICATIONS

This application claims the benefit of PCT Application PCT/EP2016/065687, filed Jul. 4, 2016, which claims priority to German Patent Application 10 2015 213 420.2, filed Jul. 16, 2015. The disclosures of the above applications are incorporated herein by reference.

FIELD OF THE INVENTION

The invention relates to a fuel delivery pump for delivering fuel, having an electric motor and having a pump impeller that may be driven by means of the electric motor, wherein the pump impeller is connected by means of a shaft to a rotor of the electric motor such that a rotational movement of the rotor is transmitted via the shaft to the pump impeller, wherein the shaft is mounted by means of an axial bearing in an axial direction and/or by means of a radial bearing in a radial direction relative to a pump stage in which the pump impeller is arranged.

BACKGROUND OF THE INVENTION

Fuel delivery pumps are both flowed through by the fuel for delivery and flowed around by the fuel. Fuel delivery pumps used in motor vehicles have electric motors which are used for driving the delivery stage, which is formed for example by a pump impeller. To ensure safety with regard to electrostatic discharges (ESD), the electrically conductive elements of a fuel delivery pump must be grounded. This serves for preventing short-circuits and thus the formation of sparks, which could lead to ignition of the fuel. Furthermore, the functionality of the fuel delivery pump may be impaired as a result of the generation of electrostatic discharges. The parts that must be grounded include in particular the pump stage, the housing of the fuel delivery pump and the motor housing, in which the rotor and the stator of the electric motor are arranged.

At the same time, it is necessary to prevent the shaft of the fuel delivery pump, on which the delivery stage is arranged, from being short-circuited with the negative pole of the voltage supply or with the ground potential, and thus likewise being grounded. Such a short circuit may lead to failure of the fuel delivery pump or to undesired deposits on the shaft or on the rotor, in particular in the vicinity of the carbon brushes. This may lead to an impairment of the service life of the fuel delivery pump.

Various devices are known in the prior art which present possible solutions to the problem. Accordingly, fuel delivery pumps are known which have additional resistances for realizing adequate grounding or decoupling. Fuel delivery pumps are also known which have a pump stage composed of plastic, whereby insulation of the shaft may be achieved. Furthermore, fuel delivery pumps are known which provide grounding of the motor housing and thus also grounding of the shaft.

A disadvantage of the devices in the prior art is in particular that either no sufficient safety with respect to electrostatic discharges may be achieved, or the grounding of the motor housing also generates grounding of the shaft, whereby deposits may form in the interior of the electric motor. The embodiment of the pump stage as a plastics component leads to lower stability and thus a shortened service life.

SUMMARY OF THE INVENTION

The problem addressed by the present invention is therefore that of providing a fuel delivery pump which exhibits adequate safety with respect to electrostatic discharges and which simultaneously exhibits electrical decoupling of the shaft with respect to the grounded elements.

The problem is solved, with regard to the fuel delivery pump, by means of a fuel delivery pump having the features of claim 1.

An exemplary embodiment of the invention relates to a fuel delivery pump for delivering fuel, having an electric motor and having a pump impeller that is driven by means of the electric motor, wherein the pump impeller is connected by means of a shaft to a rotor of the electric motor such that a rotational movement of the rotor is transmitted via the shaft to the pump impeller, wherein the shaft is mounted by means of an axial bearing in an axial direction and/or by means of a radial bearing in a radial direction relative to a pump stage in which the pump impeller is arranged, wherein an electrical insulation element is arranged between the axial bearing and the pump stage, and/or an electrical insulation element is arranged between the radial bearing and the pump stage.

As a result of the arrangement of electrical insulation elements between the axial bearing and the pump stage and/or between the radial bearing and the pump stage, electrical insulation of the shaft with respect to the pump stage and thus with respect to the housing of the fuel delivery pump and the motor housing is generated. This is particularly advantageous for preventing deposits in the region of the shaft owing to a polarity of the shaft. By means of the electrical insulation, the housing of the fuel delivery pump, the motor housing and the pump stage is connected to the negative pole of the voltage supply or to the ground potential, and thus grounding of the stated elements is achieved. This is advantageous for preventing short-circuits and electrostatic discharges.

The motor housing may be formed for example by the stator of the electric motor. Likewise, a cage-like structure may be arranged around the stator, which structure functions as a motor housing. As a result of the insertion of the electric motor into the housing of the fuel delivery pump, the electric motor is adequately protected against mechanical disturbance influences even without a closed, dedicated housing.

An electrical insulation element is preferably arranged both between the radial bearing and the pump stage and between the axial bearing and the pump stage. In this way, comprehensive electrical insulation of the shaft is achieved.

It is particularly advantageous if the radial bearing is formed as an electrical insulation element. To eliminate an additional insulation element, the radial bearing may perform not only the bearing function but also the electrical insulation function. For this purpose, the radial bearing may particularly preferably be formed from an electrically non-conductive material. For example, the bearing shells may be formed from plastic or from a non-conductive ceramic. The radial bearing may also be coated with an electrically non-conductive coating.

It is also advantageous if the electrical insulation element between the axial bearing and the pump stage is formed by a pot-shaped element. A pot-shaped element is advantageous for ensuring a secure seat of the axial bearing and also permitting simple installation of the insulation element. For this purpose, an accurately fitting cutout may be provided in the lower section of the pump stage, into which cutout the insulation element is inserted or pressed.

The pump stage is preferably formed by a two-part housing, which forms the lower termination of the housing of the fuel delivery pump. The pump impeller is arranged in the pump stage. The pump stage additionally has openings for the drawing-in and expulsion of the fluid for delivery.

It is also preferable if the axial bearing is formed by a spherical body, wherein the spherical body is arranged in the pot-shaped electrical insulation element. A spherical body is advantageous because the shaft is supported and mounted in an axial direction, wherein only a very small contact area exists between the shaft and the spherical body. The spherical body may preferably be pressed into the cutout of the pump stage, into which the insulation element has already been inserted, such that the spherical body is received fixedly in the pump stage. Alternatively, provision may also be made for the spherical body to slide on the insulation element, whereby the axial bearing is ultimately formed both by the spherical body and by the pot-shaped insulation element.

It is furthermore advantageous if the electrical insulation element is formed by an electrically non-conductive coating. An electrically non-conductive coating of the pump stage in the region of the axial bearing and/or of the radial bearing is advantageous, because it is thus likewise possible to achieve electrical insulation. The coating is preferably formed by electrically non-conductive materials, such as for example plastic or ceramic.

It is furthermore advantageous if at least one of the electrical insulation elements is formed from a plastic and/or a ceramic. Here, it is particularly advantageous if at least one of the electrical insulation elements is formed from a thermoplastic material.

It is furthermore advantageous if an electrically non-conductive seal element is arranged between the shaft and the pump stage. The seal element may for example be a ceramic or a rubber element.

Advantageous refinements of the present invention are described in the subclaims and in the following figure description.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be discussed in detail below on the basis of an exemplary embodiment and with reference to the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
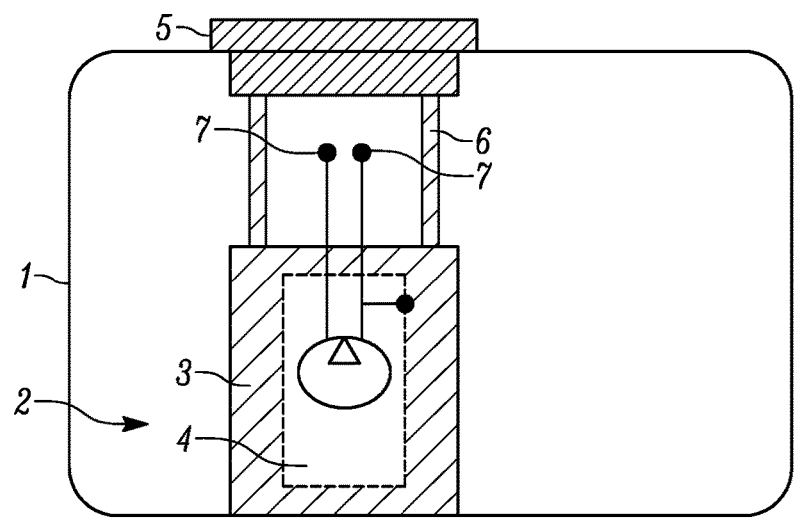
FIG. 1 shows a diagrammatic sketch showing an arrangement of a fuel delivery pump in a fuel tank.

FIG. 1 shows a schematic view of a fuel tank 1 in a motor vehicle (not illustrated). In the fuel tank 1 there is arranged a fuel delivery unit 2 which is formed from a swirl pot 3, a fuel delivery pump 4 and a flange 5. The flange 5 serves for the fastening of the fuel delivery unit 2 to the fuel tank 1. The swirl pot 3, which constitutes a reservoir for the fuel and from which the fuel is delivered by the fuel delivery pump 4 to the internal combustion engine, is connected by means of connecting elements 6 to the flange 5. The swirl pot 3 is furthermore supported with respect to the lower wall of the fuel tank 1.

The fuel delivery pump 4 is arranged within the swirl pot 3 and is connected by means of electrical conductors 7 to a voltage source. Both the fuel delivery pump 4 and the electrical conductors 7 are washed around by the fuel in the fuel tank 1. Therefore, to ensure operational reliability, grounding of the metallic elements that are in contact with the fuel is necessary.

Figure 2:
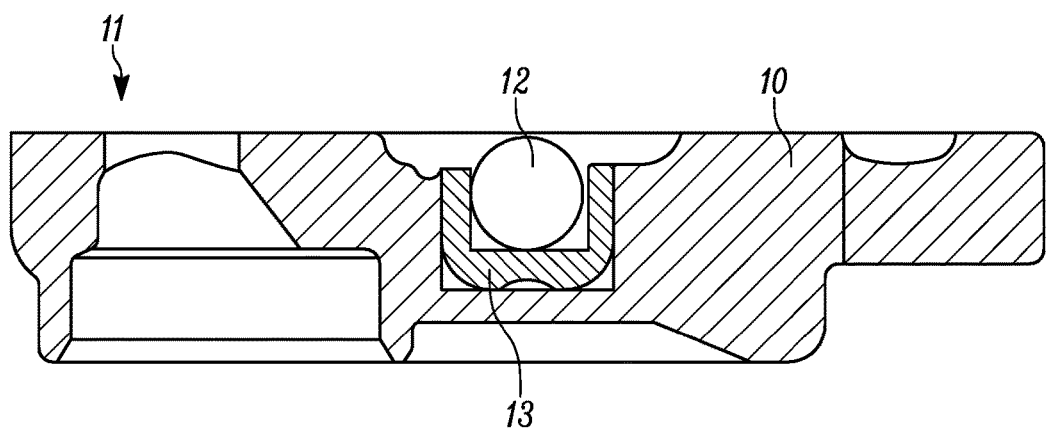
FIG. 2 shows a detailed view of the lower section of the pump stage, with in particular the pot-shaped insulation element and the spherical body, which serves as axial bearing, being shown.

FIG. 2 shows a detailed view of the lower section 10 of a pump stage 11. The pump stage 11 is generally formed in two parts and has, in its interior, a recess for receiving the pump impeller. The pump stage 11 additionally has openings through which fuel is delivered into the pump stage 11 and delivered out of the pump stage.

The section 10 has a spherical body 12 which serves as an axial bearing seat for a shaft (not shown in FIG. 2) arranged thereabove. The spherical body 12 is preferably produced from a wear-resistant material. The spherical body 12 is preferably formed from a metallic material. The spherical body 12 is arranged in a pot-shaped element 13 which spaces the spherical body 12 apart from the section 10. The pot-shaped element 13 is preferably formed from an electrically non-conductive material, and serves in particular for the electrical insulation of the spherical body 12 and of the shaft (not shown), which is connected in electrically conductive fashion to the spherical body 12 and on which the pump impeller is arranged. The pot-shaped element 13 thus forms an electrical insulation element.

Figure 3:
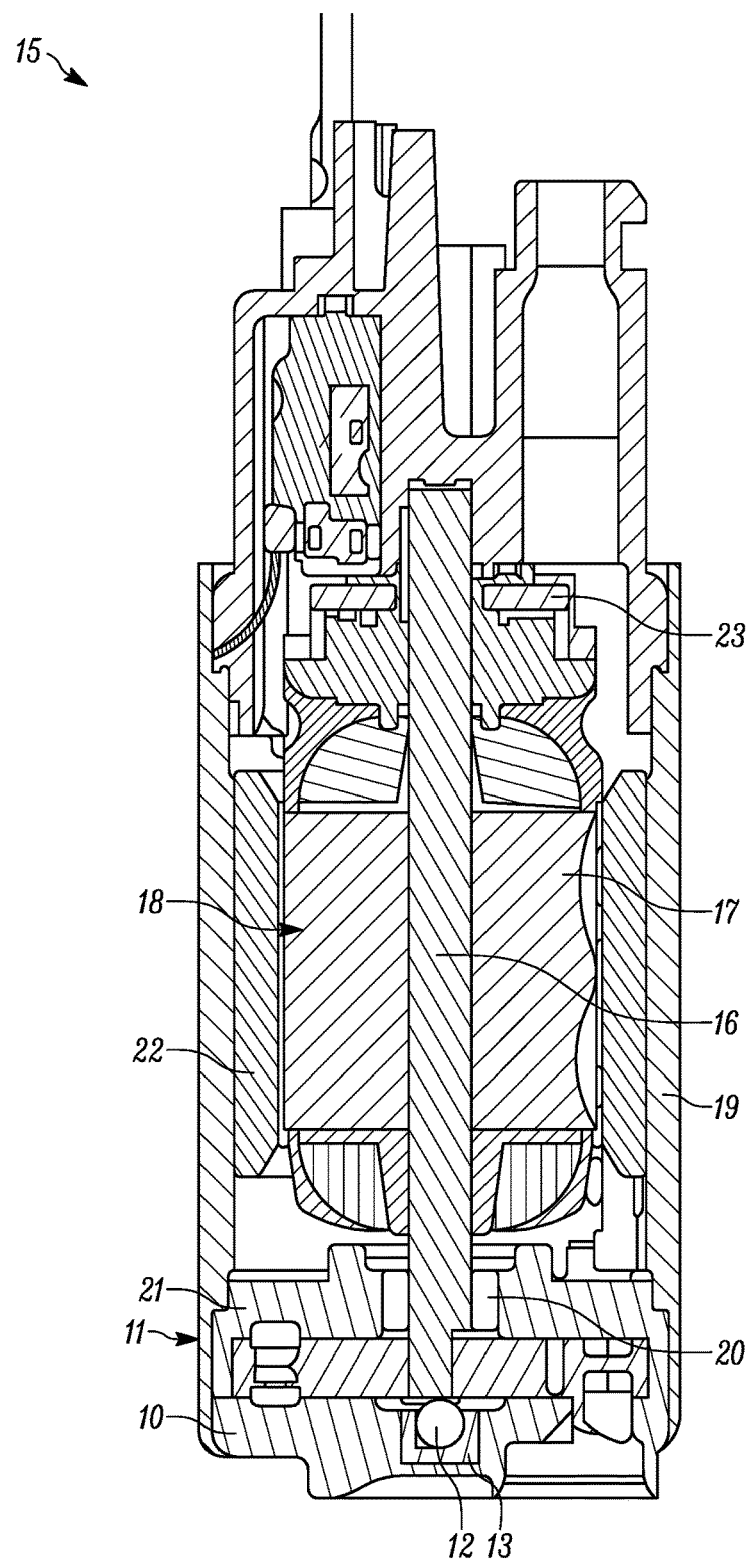
FIG. 3 shows a sectional view through a fuel delivery pump, wherein an electrically non-conductive radial bearing is arranged between the shaft and the pump stage, and an electrically non-conductive, pot-shaped insulation element is arranged between the downwardly directed axial end region of the shaft and the pump stage.

FIG. 3 shows a sectional view through a fuel delivery pump 15. Arranged centrally in the fuel delivery pump 15 is a shaft 16 which is connected to the rotor 17 of the electric motor 18 and which is rotatably mounted in the housing 19 of the fuel delivery pump 15.

The shaft 16 is mounted both by means of a radial bearing 20 and by means of an axial bearing, which is formed by the spherical body 12 that has already been shown in FIG. 2.

In particular, the housing 19 of the fuel delivery pump 15, the pump stage 11 and the stator 22 are connected to the negative pole of the voltage supply or in particular to the ground potential, in order to ensure grounding of the elements.

The radial bearing 20 is integrated into the upper section 21 of the pump stage 11 and is preferably formed by an electrically insulating material. In this way, an electrically conductive connection between the shaft 16 and the pump stage 11 is prevented. Alternatively, it is also possible for an electrically insulating layer or an electrical insulation element to be arranged between the radial bearing 20 and the pump stage 11 or the upper section 21.

By means of the combination of an electrically non-conductive radial bearing 20 or of an insulation element between the radial bearing 20 and the pump stage 11 and the pot-shaped body 13 composed of an electrically insulating material, electrical insulation of the shaft 16 relative to the grounded elements of the fuel delivery pump 15 is achieved. This prevents in particular the formation of deposits on the shaft 16 and in particular in the region of the carbon brushes 23 of the electric motor 18, which contributes to an improved service life of the fuel delivery pump 15 as a whole.

The exemplary embodiment of FIGS. 1 to 3 is in particular not of a limiting nature, and serves for illustrating the concept of the invention. Numerous structural designs and forms that deviate therefrom may be realized within the scope encompassed by the invention, without departing from the basic concept of the invention. The embodiment of FIGS. 2 and 3 is exemplary and illustrates a particularly advantageous possibility for achieving insulation of the shaft with respect to the electrically grounded elements of the fuel delivery pump, without the service life of the fuel delivery pump at the same time being adversely affected as a result of an adverse material selection, for example owing to plastics for the housing and/or the pump stage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel delivery pump for delivering fuel, having an electric motor, comprising:
    a pump impeller that is driven by the electric motor;
    a pump stage, the pump impeller being arranged in the pump stage;
    a rotor being part of the electric motor;
    a shaft, the pump impeller connected to the shaft, and the rotor of the electric motor connected to the shaft such that rotational movement of the rotor is transmitted via the shaft to the pump impeller; and
    at least one axial bearing for supporting the shaft, the at least one axial bearing located in the pump stage;
    at least one pot-shaped electrical insulation element arranged between the at least one axial bearing and the pump stage, such that the at least one electrical insulation element electrically insulates the shaft from the pump stage;
    the at least one pot-shaped electrical insulation element further comprising:
        at least one sidewall in contact with the pump stage; and
        a lower sidewall in contact with the pump stage, the lower wall terminating into the at least one sidewall;
        wherein the at least one axial bearing is in contact with the at least one sidewall and the lower sidewall.

2. The fuel delivery pump of claim 1, further comprising at least one radial bearing.

3. The fuel delivery pump of claim 2, the wherein the shaft is mounted by the at least one radial bearing in a radial direction relative to the pump stage, and the electrical insulation element is arranged between the at least one radial bearing and the pump stage.

4. The fuel delivery pump of claim 2, wherein the at least one radial bearing is formed as an electrical insulation element.

5. The fuel delivery pump of claim 1, wherein the shaft is mounted by the at least one axial bearing in an axial direction relative to the pump stage, and the electrical insulation element is arranged between the at least one axial bearing and the pump stage.

6. The fuel delivery pump of claim 1, the at least one axial bearing further comprising a spherical body, wherein the spherical body is arranged in the pot-shaped electrical insulation element.

7. The fuel delivery pump of claim 1, the at least one pot-shaped electrical insulation element further comprising an electrically non-conductive coating.

8. The fuel delivery pump of claim 1, wherein the at least one pot-shaped electrical insulation element is formed from a plastic material.

9. The fuel delivery pump of claim 1, wherein the at least one pot-shaped electrical insulation element is formed from a ceramic material.

10. The fuel delivery pump of claim 1, the at least one pot-shaped electrical insulation element further comprising a thermoplastic material.

11. The fuel delivery pump of claim 1, further comprising an electrically non-conductive radial bearing arranged between the shaft and the pump stage.

* * * * *